(12) United States Patent
Sappey et al.

(10) Patent No.: US 6,647,182 B2
(45) Date of Patent: *Nov. 11, 2003

(54) ECHELLE GRATING DENSE WAVELENGTH DIVISION MULTIPLEXER/DEMULTIPLEXER

(75) Inventors: Andrew D. Sappey, Lakewood, CO (US); Pei Huang, Lafayette, CO (US); Robert Harr, Arvada, CO (US); Gerry Murphy, Highlands Ranch, CO (US)

(73) Assignee: Zolo Technologies, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/121,956

(22) Filed: Apr. 12, 2002

(65) Prior Publication Data

US 2003/0026541 A1 Feb. 6, 2003

Related U.S. Application Data

(63) Continuation-in-part of application No. 09/628,774, filed on Jul. 29, 2000, now Pat. No. 6,415,080.
(60) Provisional application No. 60/209,018, filed on Jun. 1, 2000, provisional application No. 60/152,218, filed on Sep. 3, 1999, provisional application No. 60/172,843, filed on Dec. 20, 1999, and provisional application No. 60/172,885, filed on Dec. 20, 1999.

(51) Int. Cl.⁷ .................................................. G02B 6/34
(52) U.S. Cl. .............................. 385/37; 385/24; 385/33
(58) Field of Search ............................ 385/14, 15, 24, 385/31, 33, 37, 46; 359/124, 127, 130, 131; 398/115, 118, 121, 122

(56) References Cited

U.S. PATENT DOCUMENTS 3,658,423 A  4/1972  Elliott
3,658,424 A  4/1972  Elliott (List continued on next page.)

FOREIGN PATENT DOCUMENTS

| EP | 1008878 A1 | 6/2000 |
|---|---|---|
| WO | WO 99/31532 | 6/1999 |
| WO | WO 99/41858 | 8/1999 |
| WO | WO 00/76000 | 12/2000 |
| WO | WO 01/14920 | 3/2001 |
| WO | WO 01/14921 | 3/2001 |

OTHER PUBLICATIONS

Koonen & Wismeijer, "Optical Devices for Wavelength Division Multiplexing Systems", Philips Telecommunications Review, vol. 40, No. 2, Jul. 1982.

(List continued on next page.)

*Primary Examiner*—Phan T. H. Palmer
(74) *Attorney, Agent, or Firm*—Swanson & Bratschun LLC

(57) ABSTRACT

An apparatus for use in optical communication systems to multiplex/demultiplex an optical signal consisting of an optical channel(s) of distinct wavelength(s) having a select channel spacing within a select wavelength range. The apparatus includes a plurality of optical waveguides aligned generally along the same optical axis with each having a propagating end. At least two of the optical waveguides each propagate a distinct multiplexed optical signal comprising a plurality of channels, with the multiplexed optical waveguides being arranged in a multiplexed linear array. The others of the optical waveguides are single channel waveguides arranged in a two dimensional array with linear rows perpendicular to the multiplex linear array and with each linear row corresponding to a multiplex optical waveguide. A reflective echelle grating is optically coupled to the plurality of optical waveguides along the optical axis and receives an optical signal emitted from at least one of the optical waveguides and detracts the optical signal(s) to at least one other of the optical waveguide(s).

17 Claims, 11 Drawing Sheets

U.S. PATENT DOCUMENTS

| | | |
|---|---|---|
| 3,840,738 A | 10/1974 | Indig |
| 3,845,294 A | 10/1974 | Indig |
| 3,863,063 A | 1/1975 | Indig |
| 3,873,825 A | 3/1975 | Jones |
| 4,111,524 A | 9/1978 | Tomlinson, III |
| 4,198,117 A | 4/1980 | Kobayashi |
| 4,299,488 A | 11/1981 | Tomlinson, III |
| 4,391,523 A | 7/1983 | Hildebrand et al. |
| 4,405,199 A | 9/1983 | Ogle et al. |
| 4,468,766 A | 8/1984 | Spezio |
| 4,517,456 A | 5/1985 | Halsall |
| 4,715,027 A | 12/1987 | Mahapatra |
| 4,736,360 A | 4/1988 | McMahon |
| 4,773,063 A | 9/1988 | Hunsperger |
| 4,784,935 A | 11/1988 | Ehrfeld |
| 4,824,193 A | 4/1989 | Maeda |
| 4,846,552 A | 7/1989 | Veldkamp |
| 4,852,079 A | 7/1989 | Kinney et al. |
| 4,984,888 A | 1/1991 | Tobias |
| 4,985,898 A | 1/1991 | Furuya |
| 4,993,796 A | 2/1991 | Kapany |
| 5,018,856 A | 5/1991 | Harnly |
| 5,042,893 A | 8/1991 | Ong |
| 5,058,977 A | 10/1991 | Sorin |
| 5,119,454 A | 6/1992 | McMahon |
| 5,206,920 A | 4/1993 | Cremer |
| 5,228,103 A | 7/1993 | Chen et al. |
| 5,315,423 A | 5/1994 | Hong |
| 5,371,813 A | 12/1994 | Artigue |
| 5,477,363 A | 12/1995 | Matsuda |
| 5,546,209 A | 8/1996 | Willner |
| 5,581,639 A | 12/1996 | Davies |
| 5,583,683 A | 12/1996 | Scobey |
| 5,596,407 A | 1/1997 | Zander |
| 5,666,195 A | 9/1997 | Schultz |
| 5,706,377 A | 1/1998 | Li |
| 5,748,350 A | 5/1998 | Pan |
| 5,748,815 A | 5/1998 | Hamel et al. |
| 5,784,507 A | 7/1998 | Holm-Kennedy |
| 5,799,118 A | 8/1998 | Ogusu |
| 5,838,848 A | 11/1998 | Laude |
| 5,862,279 A | 1/1999 | Amersfoort |
| 5,912,751 A | 6/1999 | Ford |
| 5,937,113 A | 8/1999 | He |
| 5,970,190 A | 10/1999 | Fu et al. |
| 5,973,780 A | 10/1999 | Tsuboi |
| 6,011,884 A | 1/2000 | Dueck et al. |
| 6,011,885 A | 1/2000 | Dempewolf et al. |
| 6,014,482 A | 1/2000 | Laude |
| 6,018,603 A | 1/2000 | Lundgren |
| 6,061,129 A | 5/2000 | Ershov et al. |
| 6,067,178 A | 5/2000 | Zheng |
| 6,078,048 A | 6/2000 | Stevens et al. |
| 6,084,695 A | 7/2000 | Martin |
| 6,088,496 A | 7/2000 | Asghari |
| 6,097,863 A | 8/2000 | Chowdhury |
| 6,144,783 A | 11/2000 | Epworth et al. |
| 6,160,931 A | 12/2000 | Asakura |
| 6,160,933 A | 12/2000 | Laude |
| 6,181,853 B1 | 1/2001 | Wade |
| 6,282,337 B1 | 8/2001 | Horwitz et al. |
| 6,304,692 B1 * | 10/2001 | Sappey et al. ................. 385/24 |
| 6,415,080 B1 * | 7/2002 | Sappey et al. ................. 385/37 |

OTHER PUBLICATIONS

Loewen et al., "Echelles: scalar, electromagnetic, and real-groove properties", Applied Optics, vol. 34, No. 10 Apr. 1, 1995.

Richardson Grating Laboratory, "Selection of dispersing Systems XI", The Diffraction Grating Handbook, Chapter 11, 1996–1999.

Smith et al., "Diffraction Gratings Utilizing Total Internal Reflection Facets in Littrow Configuration", IEEE Photonics Technology Letters, vol. 11, No. 1, Jan. 1999.

Sun et al., "Demultiplexer with 120 Channels and 0.29–nm Channel Spacing", IEEE Photonics Technology Letters, vol. 10, No. 1, Jan. 1998.

* cited by examiner

ECHELLE GRATING DENSE WAVELENGTH DIVISION MULTIPLEXER/ DEMULTIPLEXER

RELATED APPLICATIONS

This application is a continuation-in-part application of U.S. patent application Ser. No. 09/628,774 now U.S. Pat. No. 6,415,080, filed Jul. 29, 2000, entitled, "Echelle Grating Dense Wavelength Division Multiplexer/Demultiplexer," which claims priority from U.S. Provisional Patent Application Serial No. 60/209,018, filed Jun. 1, 2000, entitled "Lens-coupled Wavelength Division (De)multiplexing System Utilizing an Echelle Grating;" No. 60/152,218, filed Sep. 3, 1999, entitled "Method and Apparatus for Dense Wavelength Multiplexing and De-multiplexing Fiber Optic Signals Using an Echelle Grating Spectrograph;" No. 60/172,843, filed Dec. 20, 1999, entitled "Improved Method and Apparatus for Dense Wavelength Multiplexing and De-multiplexing Fiber Optic Signals Using an Echelle Grating Spectrograph;" and No. 60/172,885, filed Dec. 20, 1999, entitled "Method and Apparatus for Dense Wavelength Multiplexing and De-multiplexing Fiber Optic Signals from a Single or Many Individual Fibers Using a Single Echelle Grating Spectrograph," each of which is incorporated herein in its entirety.

TECHNICAL FIELD

The present invention is directed toward optical communications, and more particularly toward a bulk optical echelle grating multiplexer/demultiplexer.

BACKGROUND ART

At the inception of fiber optic communications, typically a fiber was used to carry a single channel of data at a single wavelength. Dense wavelength division multiplexing (DWDM) enables multiple channels at distinct wavelengths within a given wavelength band to be sent over a single mode fiber, thus greatly expanding the volume of data that can be transmitted per optical fiber. The wavelength of each channel is selected so that the channels do not interfere with each other and the transmission losses to the fiber are minimized. Typical DWDM allows up to 40 channels to be simultaneously transmitted by a fiber.

The volume of data being transmitted by optical fibers is growing exponentially and the capacity for data transmission is rapidly being consumed. Burying additional fibers is not cost effective. Increasing the optical transmission rate is limited by the speed and economy of electronics surrounding the system as well as chromatic dispersion in the fibers. Thus, the most promising solution for increasing data carrying capacity is increasing the number of channels per a given bandwidth through DWDM.

DWDM requires two conceptually symmetric devices: a multiplexer and a demultiplexer. A multiplexer takes multiple beams or channels of light, each at a discrete wavelength and from a discrete source and combines the channels into a single multi-channel or polychromatic beam. The input typically is a linear array of waveguides such as a linear array of optical fibers, a linear array of laser diodes or some other optical source. The output is typically a single waveguide such as an optical fiber. A demultiplexer spacially separates a polychromatic beam into separate channels according to wavelength. Input is typically a single input fiber and the output is typically a linear array of waveguides such as optical fibers or a linear array of photodetectors.

In order to meet the requirements of DWDM, multiplexers and demultiplexers require certain inherent features. First, they must be able to provide for a high angular dispersion of closely spaced channels so that individual channels can be separated over relatively short distances sufficiently to couple with a linear array of outputs such as output fibers. Furthermore, the multiplexer/demultiplexer must be able to accommodate channels over a free spectral range commensurate with fiber optic communications bandwidth. Moreover, the devices must provide high resolution to minimize cross talk and must further be highly efficient to minimize signal loss. The ideal device would also be small, durable, thermally stable, inexpensive and scalable.

Much of the attention in DWDM devices has been directed to array waveguides. Array waveguides have a set of intermediate pathways, e.g., waveguides, that progressively vary in length to incline wavefronts of different wavelength signals within a free spectral range. Confocal couplers connect the common and individual pathways to opposite ends of the intermediate pathways. One illustrative example is disclosed in Lee, U.S. Pat. No. 5,706,377. Array waveguides suffer from the disadvantages of being expensive to design and manufacture, unable to provide high channel densities over broad wavelengths necessary for DWDM, thermal sensitivity and a lack of scalability and polarization dependent and high insertion losses.

Another family of DWDM devices use a network of filters and/or fiber Bragg gratings for channel separation. Pan, U.S. Pat. No. 5,748,350, is illustrative. However, the channel spacing of these devices, on the order of 0.8 or 1.6 nanometers (nm), limits the number of wavelengths that can be coupled into or out of a fibers. Further, these devices present significant issues of optical loss, cross talk, alignment difficulties and thermal sensitivity.

Various bulk optical DWDM devices have also been investigated in the prior art. Fu et al., U.S. Pat. No. 5,970,190, teaches a grating-in-etalon wavelength division multiplexing device using a Bragg diffraction grating. Fu requires either a tilt mechanism or fabrication of an etalon waveguide with reflective exposed faces having a Bragg grating written into the waveguide. This device has limited channel separation capacity and requires a tilt mechanism that can be difficult to control and is unreliable.

Dueck, U.S. Pat. No. 6,011,884, teaches a DWM device with a collimating optic and bulk grating in near-littrow configuration. Dueck is concerned with the use of a homogeneous boot lens to create a one-piece integrated device. This device is intended to be compact, robust and environmentally and thermally stable. However, the device taught by Dueck fails to address the need to provide many channels for DWDM, high efficiency and a short focal length to provide a compact device.

Lundgren, U.S. Pat. No. 6,018,603, like Dueck, teaches the use of a bulk diffraction grating for DWM. Specially, Lundgren teaches the use of an echellette grating in combination with a rod-like graded refractive index lens or imaging lens for correcting any offset in the focal length of a focusing lens. Lundgren also fails to teach a DWDM device capable of accommodating high channel density and providing a high angular dispersion of channels so as to minimize focal length and apparatus size.

Other examples of techniques for multiplexing and demultiplexing optical signals include the use of birefringement element, the use of optical band pass filters, the use of interference filters, the use of prisms and the use of sequences of cascaded gratings. However, none of these systems provide the combination of beneficial attributes necessary to meet the growing needs for DWDM.

The present invention is intended to overcome some of the problems discussed above and to provide a bulk optical echelle grating multiplexer/demultiplexer with many of the attributes necessary for cost-effective DWDM.

SUMMARY OF THE INVENTION

A dense wavelength multiplexer/demultiplexer ("DWDM") for use in optical communication systems using optical signals in a select near infrared wavelength range and a select channel spacing includes at least two multiplex optical waveguides each propagating a distinct multiplexed optical signal comprising a plurality of channels. The multiplex optical waveguides are arranged in a linear array. A two dimensional array of single channel waveguides is arranged in linear rows perpendicular to the multiplexed linear array with each linear row corresponding to a multiplex optical waveguide. A reflective echelle grating is optically coupled to the multiplex optical waveguides and the single channel optical waveguides. The echelle grating has a groove spacing of between about 50–300 grooves/millimeter and a blaze angle of between about 51–53 degrees. The select near infrared wavelength range is preferably between about 1520–1610 nanometers and the select channel spacing is 0.8 nanometers or less. A collimating/focusing optic having a select focal length may be optically coupled between the multiplex and single channel waveguide arrays. The collimating/focusing optic preferably has a focal length less than 152.4 millimeters.

Another aspect of the present invention is an apparatus for use in optical communication systems to multiplex or demultiplex an optical signal comprising optical channel(s) of distinct wavelength(s) having a select channel spacing within a select wavelength range. The apparatus includes a plurality of optical waveguides aligned generally along the same optical axis with each having a propagating end. At least two of the optical waveguides each propagate a distinct multiplexed optical signal comprising a plurality of channels, with the multiplexed optical waveguides being arranged in a multiplex linear array. The others of the optical waveguides are single channel waveguides arranged in a two dimensional array with linear rows perpendicular to the multiplex linear array and with each linear row corresponding to a multiplex optical waveguide. A reflective echelle grating is optically coupled to the plurality of optical waveguides along the optical axis and receives an optical signal emitted from at least one of the optical waveguides and diffracts the optical signal(s) to at least one other of the optical waveguide(s). The echelle grating may have a groove spacing of between about 50–300 grooves/millimeter and a blaze angle of between about 51–53 degrees.

Another aspect of the present invention is a method of multiplexing or demultiplexing an optical signal in a optical communication systems. The optical signal comprises optical channels of a 0.8 nanometer or less channel spacing and different wavelengths within a wavelength range between 1520–1610 nanometers. The method includes providing a plurality of optical waveguides aligned generally along the same optical axis, at least two of the waveguides propagating a plurality of multiplexed channels, the at least two multiplexed waveguides being aligned in a multiplex linear array. The others of the optical waveguides propagate single channels. The single channel waveguides are aligned in a two-dimensional array having linear rows perpendicular to the multiplexed linear array with each multiplexed waveguide corresponding to a distinct linear row of single channel waveguides. An optical signal is directed from at least one of the optical waveguides to a reflective echelle grating optically coupled to the plurality of optical waveguides along the optical axis. The optical signal is diffracted generally along the optical axis and optically coupled into at least one other of the optical waveguides at a select focal length. The reflective echelle grating may have a blaze angle of between about 51–53 degrees and a groove spacing of between about 50–300 grooves/millimeter.

Yet another aspect of the invention is a bulk optic echelle grating for use in multiplexing and demultiplexing optical signals in optical communication systems operating in a near infrared wavelength range. The grating has a groove spacing of between about 50–300 grooves/millimeter and a blaze angle of between about 51–53 degrees.

DETAILED DESCRIPTION OF THE PREFERRED EMBODIMENT

Figure 1:
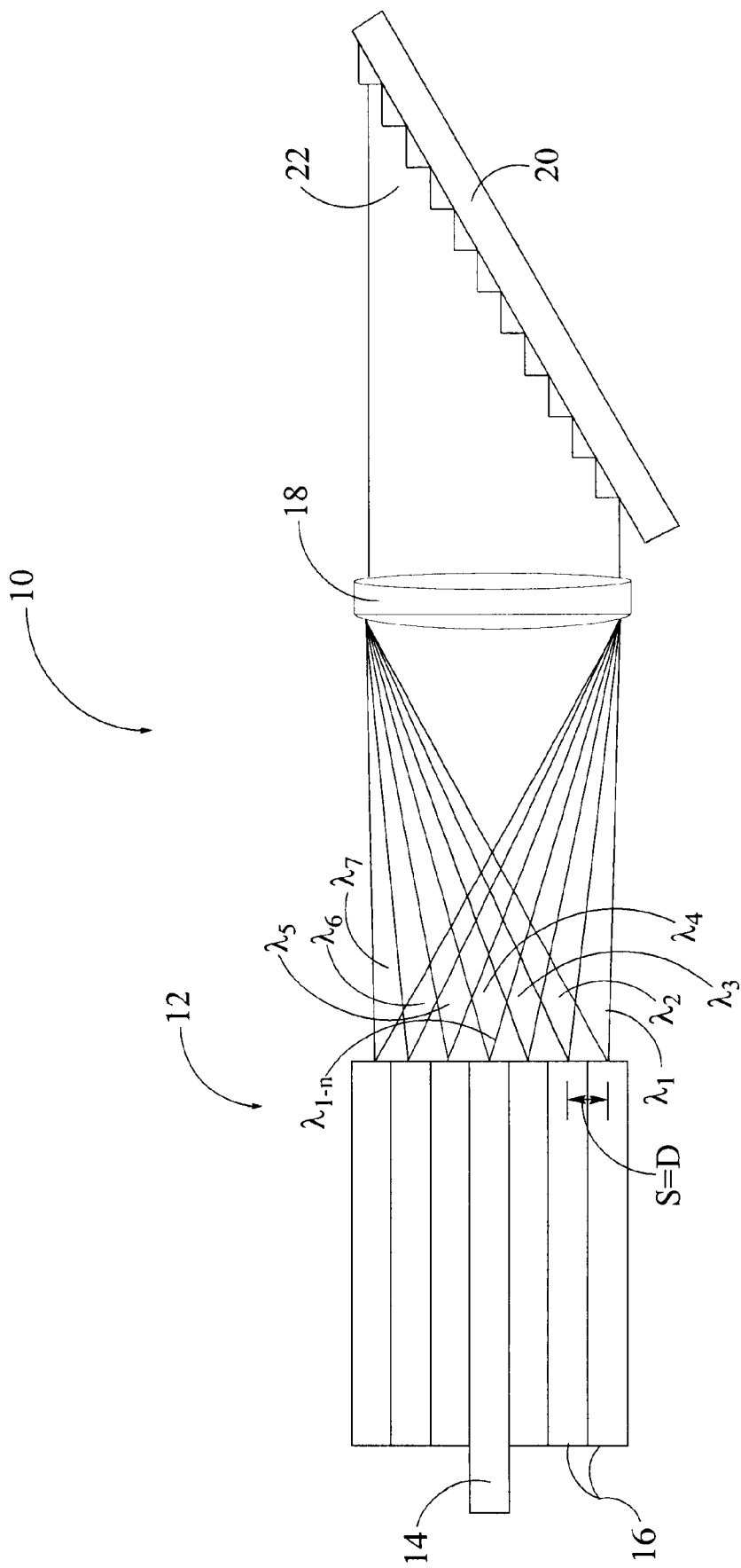
FIG. 1 is a schematic plan view of a multiplexer/demultiplexer using a bulk echelle grating in accordance with the present invention.

A multiplexer/demultiplexer for use in optical communication systems 10 of the present invention is illustrated schematically in FIG. 1. It includes a pigtail harness 12 consisting of an input waveguide 14, a plurality of output waveguides 16 arranged in a linear array adjacent the input fiber, a collimating/focusing lens 18 and an echelle grating 20, each of which are optically coupled. In the present discussion the multiplexer/demultiplexer will be discussed in terms of a demultiplexer. The description applies equally to a multiplexer, only with the function of the input and output waveguides 14, 16 reversed. Also, for the sake of clarity, only seven output waveguides are illustrated (the center output waveguides underlies the input fiber in FIG. 1 as can be seen with respect to elements 142 and 148 of FIG. 14). Furthermore, the waveguides 14, 16 are preferably single mode optical fibers. As will be discussed in greater detail below, in the preferred embodiment, 90 or more output waveguides can be associated with a single input waveguide, depending upon the bandwidth channel, separation and a number of other factors.

As used herein, "optically coupled" or "optically communicates" means any connection, coupling, link or the like, by which optical signals carried by one optical element are imparted to the "coupled" or "communicating" element. Such "optically communicating" devices are not necessarily directly connected to one another, but may be separated by a space through which the optical signals traverse or by intermediate optical components or devices.

As illustrated in FIG. 1, the multiplexer/demultiplexer 10 is in "near littrow configuration," meaning that the incident beam $\lambda_{1-n}$ and the channels diffracted off the surface of the grating $\lambda_1, \lambda_2, \lambda_3, \lambda_4, \lambda_5, \lambda_6, \lambda_7$ are generally along the same optical axis (that is, they trace a very close path) and the lens both collimates the input beam $\lambda_{1-n}$ and focuses the diffracted channels $\lambda_1$-$\lambda_7$ to the output fibers 16.

The echelle grating 20, like other gratings such as echellette gratings, uses interference between light wavefronts reflected from various portions of its ruled surface or steps 22 to divide the incident beam consisting of a plurality of channels $\lambda_{1-n}$ having a select channel spacing within a select wavelength range $\lambda_{1-n}$ into separate channels of wavelength beams $\lambda_1$-$\lambda_7$ which are angularly dispersed by the grating into output waveguides some distance away. Referring to FIG. 1, the channel separation of the device (D), which is the product of the focal length of the focusing/collimating optic the angular dispersion and the incremental channel spacing, is equal to the distance S between the center of adjacent output waveguides. The echelle grating 20 is particularly suited to use in optical communication systems because of a unique combination of properties: 1) it provides clear channel separation notwithstanding channels being closely spaced (0.4 nm or less); 2) it provides large spatial separation of channels over relatively short distances; and 3) it is highly efficient in the range of optical communications wavelengths.

Figure 2:
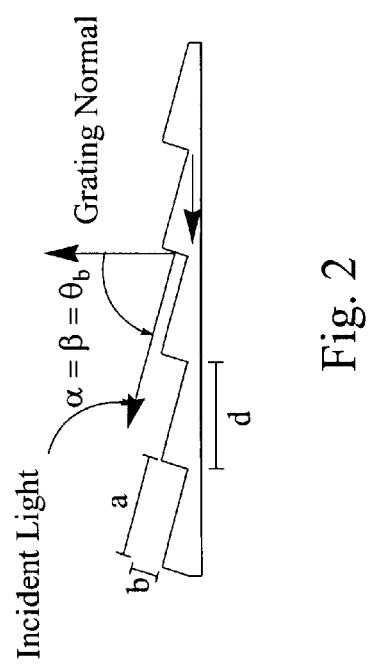
FIG. 2 is an enlarged cross-section of the echelle grating grooves illustrating relevant dimensions.

Referring to FIG. 2, for the purpose of this specification, echelle gratings are a special grating structure having groove density (1/d) of under 300 grooves/mm and a blaze angle $\theta_b$ of greater than 45° which typically operate at an order of diffraction greater than 1. In combination, these features enable a multiplexer/demultiplexer that efficiently separates closely spaced channels over a relatively small focal length (e.g., 5 inches) enabling a small form factor form factor (on the order of 10 inches in length or less).

Consideration of certain external and performance constraints point to the desirability of echelle gratings for DWDM. The external constraints include the following:

1) Minimize focal length, with a focal length of under 6 inches desired.
2) Center wavelength in near infrared, approximately at the center of the C-band, 1550 nm.
3) A minimal channel spacing (e.g., 0.4 nm or less).
4) Large free spectral range, 150 nm.
5) System f number in the range of 4–8.
6) Rugged, minimum cost system.

The performance constraints include:

1) Resolution greater than 20,000.
2) High dispersion.
3) Flat response across spectral range.
4) High efficiency or low loss, (>75%).
5) Minimize polarization dependent loss.

The external constraints of ruggedness size and cost minimization as well as performance constraints of ease of alignment and high efficiency dictate a littrow configuration, which simplifies the system optimization analysis.

FIG. 2 illustrates the echelle grating geometry and the variables set forth below.

$\theta_b$=blaze angle
$\alpha$=incident angle
$\beta$=diffracted angle
In littrow, $\theta_b$=$\alpha$≅$\beta$
b=step (reflective surface) size
d=1/groove density
a=riser size Examination of a number of constraining factors discussed above illustrate the utility of echelle gratings for DWDM.

1. Constraining Factors: f number (f) in range of 4–8 and resolution ("R")>20,000.

Result: For a grating in littrow configuration, $$R > 2\left(\frac{W}{\lambda}\right),$$

where W is the illuminated width of the grating. Thus, or W≈(20,000/2)(1550 nm) or W≈1.55 cm W×f=fl (focal length), or fl≈1.55 cm×8≈124

2. Constraining Factors: Fl>124 mm and channel separation at least 80μ.

Result: For an echelle grating in littrow, dispersion $$\left(\frac{d\theta_b}{d\lambda}\right) = \frac{m}{b} \cdot fl,$$

where m=order of diffraction. Thus, assuming channel separation to be at least 80μ, $\Delta\lambda$=4×10$^{-4}$μ and fl=1.2× 10$^4$μ, m>1.5b.

3. Constraining Factors: FSR (free spectral range)>150
Result:

$$FSR = \frac{\lambda}{m},$$

which implies $$m = \frac{1550}{10},$$

or m≦10.

4. Constraining Factors: Wish to provide a flat response over the bandwidth.

Result: The diffraction envelope must have a broad enough maximum so that loss is minimized at the extremes of the wavelength range. This dictates b<8.5μ. An order over 7 spreads the light too much across the diffraction peak, resulting in unacceptably low efficiency. Thus: b<8.51μ and m≦7.

5. Constraining Factors: High efficiency. (>85°)

Result: Efficiency is a function of step size. A step size must be selected providing a channel width capturing 90% of the signal at a select order.

b>3μ yields suitable efficiency.

6. Constraining Factors: Limitations on m from 4, and 2. above.

Result: 1.5<m<7.

7. Constraining Factors: For an echelle grating in littrow mode:

$$a = \frac{m\lambda}{2}.$$

Result: a=3.88μ at m=5
4.65μ at m=6
5.43μ at m=7

Figure 3:
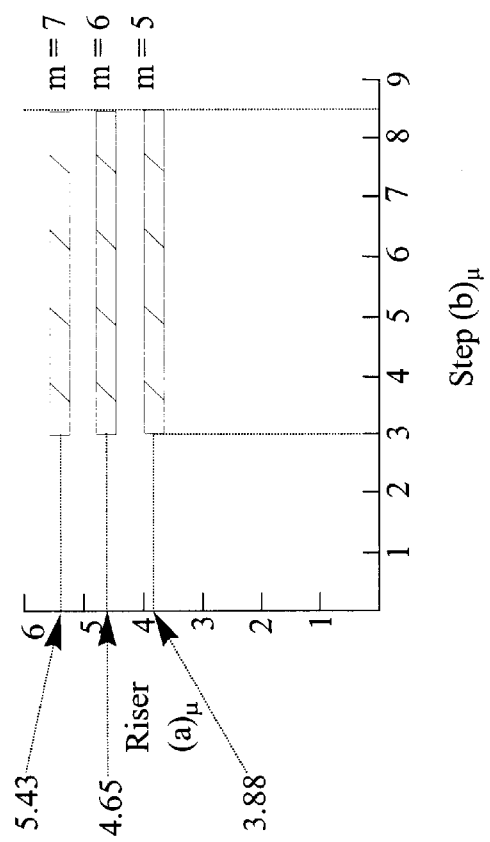
FIG. 3 is a graphical representation of possible step widths and riser heights at different orders which may yield a working echelle grating.

FIG. 3 illustrates that these constraints and results provide a range of values for a and b at a given range of suitable orders (m). Simulations aimed at maximizing efficiency and minimizing polarization dependent loss optimize around blaze angles and groove frequencies that fall in the range of echelle gratings, i.e., 45<θ$_b$<78° and d<300 grooves/nm. Furthermore, limitations on manufacturing further dictate that only echelle gratings can provide the necessary results within the external and performance constraints.

In designing a functioning multiplexer/demultiplexer, a number of design parameters were selected that were dictated by many of the external and performance constraints set forth above. An exemplary configuration is illustrated schematically in FIG. 4, with like elements having the same reference number as FIG. 1. The dictating constraints and their effect on the exemplary bulk echelle grating DWDM are as follows:

1. Channel Characteristics

Currently optical communications utilize what is know as the "C" band of near infrared wavelengths, a wavelength band ranging from 1528–1565 nanometers (nm). This provides a bandwidth or free spectral range of 37 nm available for channel separation. Known prior art multiplexer/demultiplexers require a channel spacing of 0.8 nm or even 1.6 nm, resulting in a possibility of only between 48 and 24 channels. Because echelle gratings provide markedly superior channel dispersion, a much smaller channel spacing of 0.4 nm was chosen, resulting in a possibility of 93 channels over the C band. As the tuning range of semiconductor lasers increases and optical communications expand beyond the "C" band to include the "L" band (1566–1610 nm) and the "S" band (≈1490–1527 nm), a total bandwidth of about 120 nm or more is foreseeable, creating a possibility of the multiplexer/demultiplexer accommodating 300 channels or more per input fiber.

Current optical communications operate primarily at a channel frequency of 2.5 GHz, known as OC48. At OC48 the channel width $\lambda_{48}$=0.02 nm. Optical communications are currently beginning to adopt a frequency of 10 GHz, know as OC192. At OC192 the channel width $\lambda_{192}$=0.08 nm.

2. Fiber Dimensions

Figure 4:
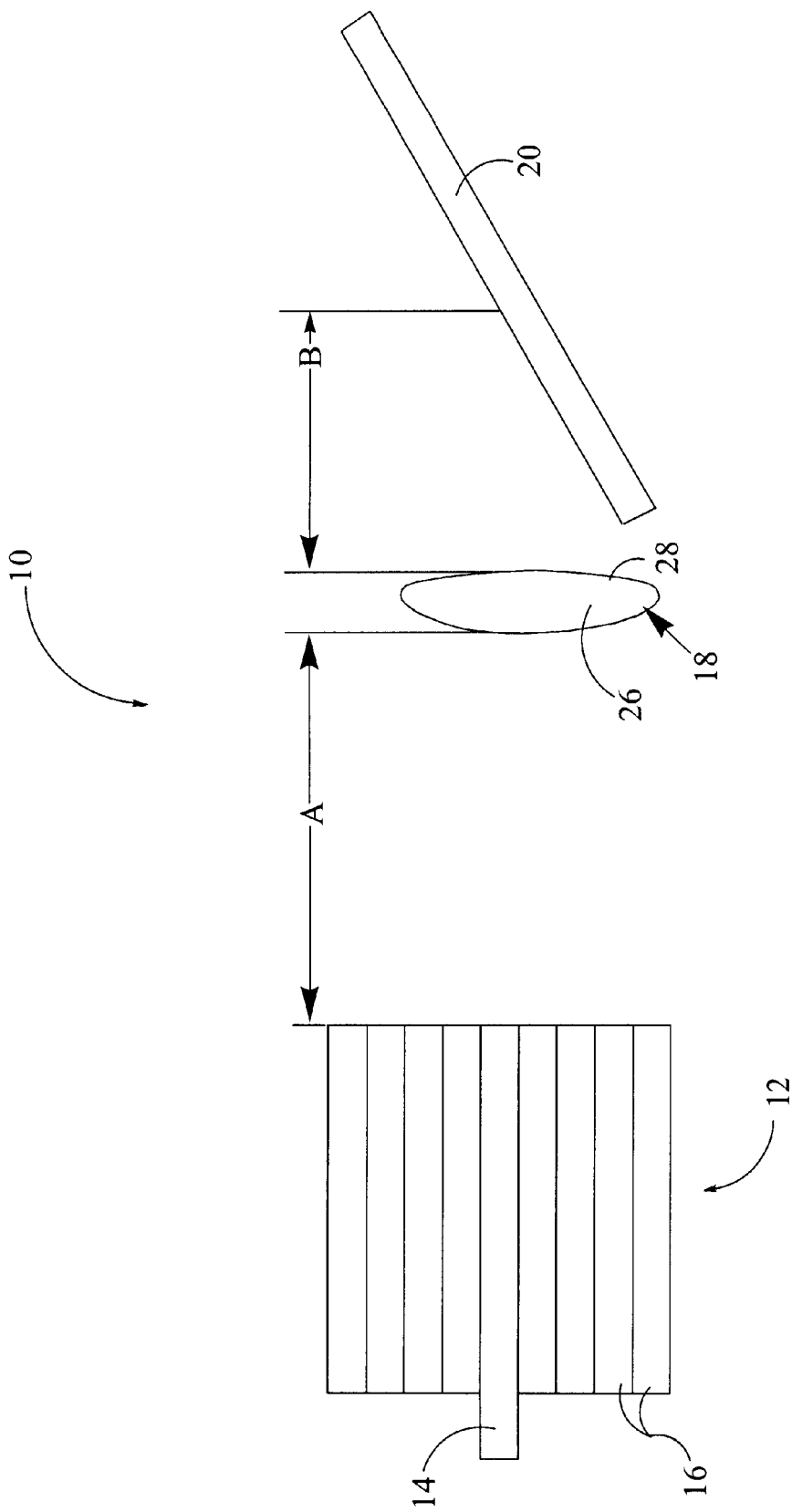
FIG. 4 is a schematic representation of an example of a multiplexer/demultiplexer with a bulk echelle grating in accordance with the present invention.

Standard single mode optical fiber used in optical communications typically have an outer diameter of 125 microns (μ) and a core diameter of 10μ. Optical fibers having an outer diameter of 80μ and core diameter of 8.3 i are available, model SM-1250 manufactured by Fibercore. In this example, both the input fiber 14 and the output fiber 16 are single mode and share the 80μ outer diameter. Assuming the output fibers 16 are abutted in parallel as illustrated in FIG. 4, this results in the core centers being spaced 80μ, or a required channel separation D of 80μ at the select focal length. Because fibers of different outer diameter are available and fibers cladings can be etched away, it is possible that the 80μ spacing can be reduced, with core spacing of 40μ or less being foreseeable, which could enable shorter focal lengths or different echelle grating designs having lesser angular dispersion. The spread of the beam emitted from the fiber was 100 at the e-folding distance, although it was later found to be 14° at the 1% point.

3. Form Factor

The design was intended to provide a high channel density in a form factor consistent with or smaller than used in current multiplexer/demultiplexer devices. A total length of between 10–12 inches was the design target. To accommodate all the optics and harnesses, a maximum focal length of 5 inches (127 mm) was chosen. As discussed above, in light of the constraining factors of the f number between 4–8 and a resolution (R)>20,000, a focal length of 124 was ultimately dictated.

4. Dispersion Limitations

In order to prevent the loss of data, it was necessary that the dispersion of the echelle grating be constrained. The initial 0.4 μm channel spacing at the echelle grating was required to be about 80μ of separation at the output fibers (corresponding to the core spacing). On the other hand, the 0.08 μm channel width of OC192 frequencies could not disperse to much greater than the fiber core aperture over the focal length. Thus:

$$I = \left(I_o\left(\frac{\sin\beta}{\beta}\right)\right)^2 \left(\frac{\sin N\alpha}{\alpha}\right)^2$$

5. Grating Design

The variables affecting grating design are:
1) wavelength range
2) efficiency
3) dispersion (D)
4) desired resolution $$\left(\frac{\lambda}{\Delta\lambda}\right)$$

FIG. 3 is a cross-section showing the principle echelle grating dimensions including: blaze angle (θ$_b$), wavelength range and groove density (d).

For design of the grating, 150 channels centered on 1550 nm was chosen. This results in a physical size of the spectral image of (number of channels)×(maximum separation, or 150×80μ=12,000μ. This desire to have 90% of the intensity contained in 12,000% constrains the size of b. The far field pattern of the diffraction grating is $$I = \left(I_o\left(\frac{\sin\beta}{\beta}\right)\right)^2 \left(\frac{\sin N\alpha}{\alpha}\right)^2$$

N=number of lines illuminated, $$\beta = \frac{\pi b}{\lambda}\sin\theta_b \text{ and } \alpha = \frac{\pi d}{\lambda}\sin\theta_b.$$

Spread sheet calculations show that b≦5.5λ (or b≦8.5μ), is necessary to make the spectral image >12,000μ at its 90% intensity point. In littrow mode, the angular dispersion is:

$$\left(\frac{d\theta}{d\lambda}\right) = \frac{m}{d\cos\theta_b} \text{ or } \left(\frac{d\theta}{d\lambda}\right) = \frac{m}{b}$$

$$\Delta x(\text{linear separation}) = (\Delta\theta)(fl)(\Delta\lambda) = \left(\frac{m}{b}\right)(\Delta\lambda) \cdot (fl)$$

$$80\mu < \frac{m}{b}(4 \times 10^{-4}\mu)(1.2 \times 10^5 \mu)$$

$$m > \frac{1.6 b\mu}{.6\mu} > 1.6 b\mu$$

However, for OC192, dispersion must be constrained to contain the 0.08 nm channel width in a 10μ core, so that m<3.34bμ.

Thus, 1.67b<m<3.34b (Condition B).

The desired resolution $$(R) = \frac{\lambda}{\Delta\lambda} = N \cdot m.$$

Here, λ=1550 nm and Δλ=0.08 nm, yielding a required resolution R=19,375 or approximately 20,000. Assuming a beam size at the grating of 2.1 cm (based upon a fl=124 cm and 10° divergence):

$$N = \frac{p(2.1)}{\cos\theta_b}, p = \text{lines/cm} = \frac{1}{d}$$

Thus, $$20,000 < \frac{2.1 \times 10^{-2} \text{ cm}}{d\cos\theta} \cdot m = \frac{2.1^{-2} \text{ cm}}{B}m \text{ or}$$

b<1.05 m (Condition C).

To align the order m with the diffraction peak in littrow mode, we know $$a = \frac{m\lambda}{2},$$

or a must have the values:

$$a = \begin{array}{l} 3.88\text{ μ at } m = 5 \\ 4.65\text{ μ at } m = 6 \\ 5.43\text{ μ at } m = 7 \end{array} \right\} \quad \text{(Condition D)}$$

Only as $\theta_b$ increases to greater than 45° is it possible for conditions A and D to be satisfied. Assuming $\theta_b$=60°, and m=5, a=3.38μ b=2.241μ d=4.48μ.

All of conditions A–D are satisfied.

Selection of the precise groove density and blaze angle are also affected by the polarization dependent loss and manufacturing constraints. For the embodiment illustrated in FIG. 4 use of an interferometrically controlled ruling engine to machine the line grating drove the selection of a line density evenly divisible by 3600. Considering these various factors led to selection of groove density d=171.4 grooves/mm and m=5. This leads to a=3.88μ, b=3.55μ, and a corresponding blaze angle of 52.6° for this example. However, this methodology shows that for a focal length between 30–125 mm and an order of 5–7, potential blaze angles range between 51° and 53° and the groove density carries between 50 and 300 grooves/mm to provide linear channel separation of between 40–125 microns and an angular dispersion of the echelle of between 0.091 and 0.11 degrees/nm.

In the example of FIG. 4, the echelle grating has a groove density of 171.4 grooves/mm and a blaze angle of 52.6°. The echelle may be formed from one of several known methods. For example, it may be formed from an epoxy layer deposited on a glass substrate into which a master die defining the steps is pressed. The steps are then coated with a highly reflective material such as gold. The steps may also be precision machined directly into a glass or silicon substance and then coated with a reflective material. A further option is the use of photolithographic techniques described in McMahon, U.S. Pat. No. 4,736,360, the contents of which are hereby expressly incorporated by reference in its entirety.

The lens 18 could be a graded index (GRIN) optic with spherical surfaces or a compound lens with one or more surfaces that might not be spherical (aspheric). The use of lenses or a single lens to collimate the beam and focus the dispersed light limits spherical aberrations or coma resulting from the use of front surface reflectors that require the optical rays to traverse the system in a off-axis geometry. A first type of potential lens uses a radially graded refractive index to achieve near-diffraction limited imaging of off-axis rays. A second type of lens actually consists of at least two individual pieces cemented together (doublet). Another option uses three individual lens pieces (triplet). These pieces may individually have spherical surfaces, or if required for correction of certain types of aberration, aspheric surfaces can be utilized. In this case, the lens would be referred to as an aspheric doublet or triplet.

In the example illustrated in FIG. 4, the lens 18 is an aspheric singlet of a 25.4 mm diameter having a spherical surface 26 with a radius of curvature of 373.94 mm and an aspheric surface 28 with a radius of curvature of 75 mm and a conic constant of -0.875. The average focal length in the 1520–1580 nm wavelength range is 125.01 nm. Thus, the distance A from the center of the spheric surface to the emitting end of the input and output fibers 14, 16 is about 125 mm. The average distance between the aspheric surface 28 and the center of the surface of the grating 20 is about 43.2 mm.

Figure 6:
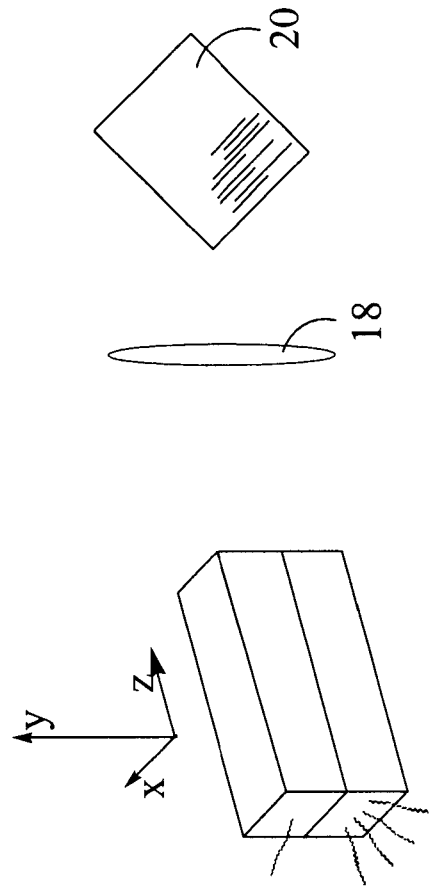
FIG. 6 is a perspective view of the multiplexer/demultiplexer with bulk echelle grating of FIG. 1 illustrating the potential adjustment of the components.
Figure 5:
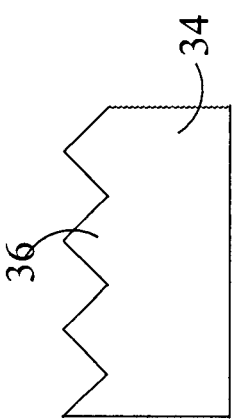
FIG. 5 is a partial cross-sectional view of a pigtail template.
Figure 7:
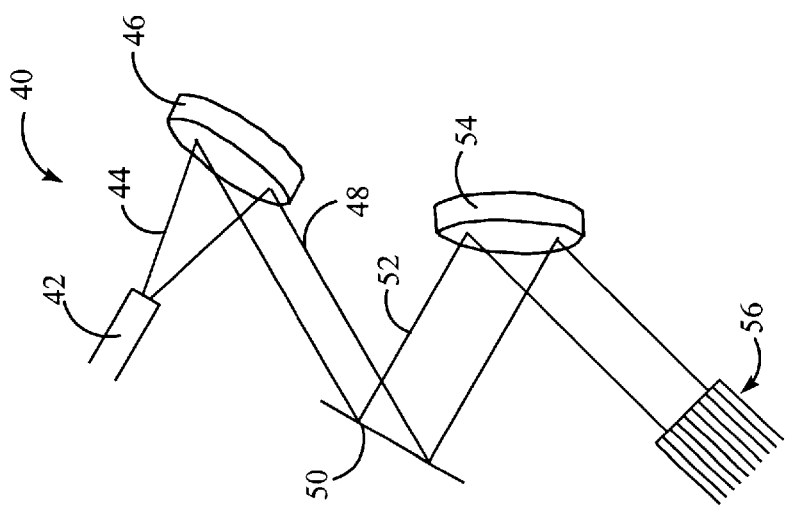
FIG. 7 is a schematic view of a first alternate embodiment of the multiplexer/demultiplexer using a bulk echelle grating including a pair of collimating/focusing concave mirrors.

In the pigtail 12 of FIG. 1, the input and output fibers terminate in the same plane. This is also the case with the example illustrated in FIG. 4. In some configurations, however, the inlet 14 and outlet fibers 16 are on slightly different axes and do not terminate in the same plane. The fibers 14, 16 of the pigtail are precisely located by being fit into a template 34 illustrated schematically in FIG. 5. The template 34 has a plurality of parallel v-shaped grooves 36. The template and v-shaped grooves are preferably formed by etching the grooves 36 into a silicon substrate. In the example in FIG. 4, the grooves of the template are spaced $80\mu$. The example configuration of FIG. 4 is shown in perspective view in FIG. 6. To facilitate alignment, the pigtail 12, the lens 18 and the grating 20 have limited freedom of movement in multiple directions. Once they are moved into position, they are secured in place by clamps or a suitable bonding agent. The lens 18 is held stationary. The pigtail 12 is movable by translation along the x, y and z axes. The input and output fibers can be moved independently along the x axis. The echelle grating 20 is fixed against translational movement except along the z axis. It can be rotated about each of the x, y and z axes. Other possible combinations of element movement may also yield suitable alignment. The dimensions and performance criterion of the DWDM device 10 of FIG. 4 are summarized as follows:

Fibers: SM-1250 (Fibercore) outer diameter
  Outer diameter $80\mu$
  Core diameter $8.3\mu$
  f Number 4-8
Lens: Aspheric singlet
  Average focal length (fl)=125
Optical Signal: $\lambda$=1528–1565 nm
  channel spacing 0.4 nm
Grating:
  d=$5.83\mu$
  $\theta_b$=52.6°
  order=6
System Performance:
  D (linear separation)=$80\mu$
  Resolution (R)=20,000
  Efficiency 75% an alternative to the use of a littrow configuration as well as the use of collimating lenses, concave mirrors may be used for collimating and focusing the incident beam. A first alternate embodiment of a concave mirror dense wavelength multiplexer/demultiplexer 40 is shown schematically in FIG. 7. Single mode input fiber 42 emits a divergent incident beam 44 consisting of multiplexed channels onto the surface of a collimating/focusing concave mirror 46. The collimated beam 48 is then directed in an off-axis manner to the surface of an echelle grating 50. The echelle grating disperses the channels according to their wavelength in the manner discussed above with respect to FIGS. 1 and 4 and the dispersed channels 52 are reflected off axis off the front surface of the concave collimating/focusing mirror 54. The collimating/focusing mirror 54 then focuses and reflects the various channels to a corresponding fiber of an output fiber array 56. As alluded to above with respect to the discussion of the embodiments of FIGS. 1 and 4, use of surface reflecting optics such as the collimating mirror 46 and the concave focusing mirror 54 requires that the optical beams traverse the system in an off-axis geometry which creates significant aberrations (spherical aberrations and coma) that significantly limit the performance of the system. However, the use of the front surface reflecting optics has the potential of facilitating a more compact form factor than is possible with littrow configurations using a single optical lens. As should be readily apparent, combinations of front surface reflecting optics and lenses can be used in non-littrow configurations where necessary to balance form factor minimization requirements and optical aberrations.

Figure 8:
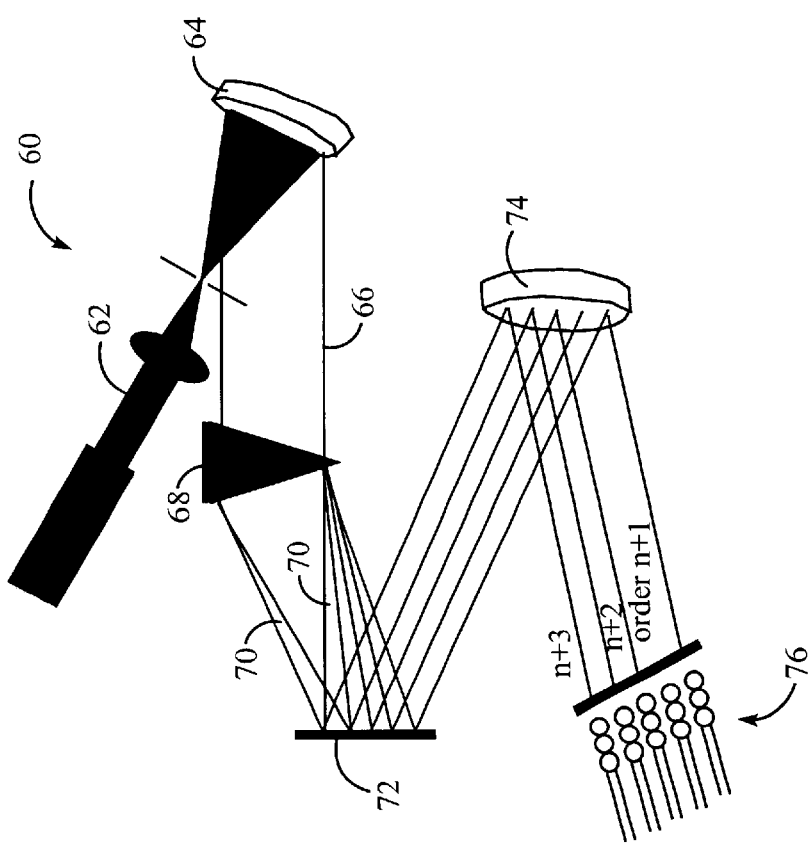
FIG. 8 is a second alternate embodiment of the multiplexer/demultiplexer of FIG. 7 further including a prism providing for wavelength dispersion in a horizontal direction.

A second alternate embodiment 60 is illustrated in FIG. 8 which is a schematic representation of an echelle grating multiplexer/demultiplexer using a prism in combination with front surface optical mirrors. In this embodiment, light from a single mode input fiber 62 is directed off a collimating/focusing mirror 64 and the collimated beam 66 is directed through prism 68. The prism 68 provides for wavelength dispersion in a horizontal direction as indicated by the beams 70. These horizontally dispersed beams 70 are directed off the echelle grating 72 which in turn diffracts the beams 70 in an orthogonal dimension and directs these diffracted beams off the front surface of the concave collimating/focusing mirror 74. A two dimensional output fiber array 76 receives the focused beams from the collimating/focusing mirror 74. The use of the prism 68 in combination with the echelle grating 72 provides a two dimensional array of wavelength dispersion and may therefore facilitate detector arrays of shorter length as may be desirable in certain applications.

Figure 9:
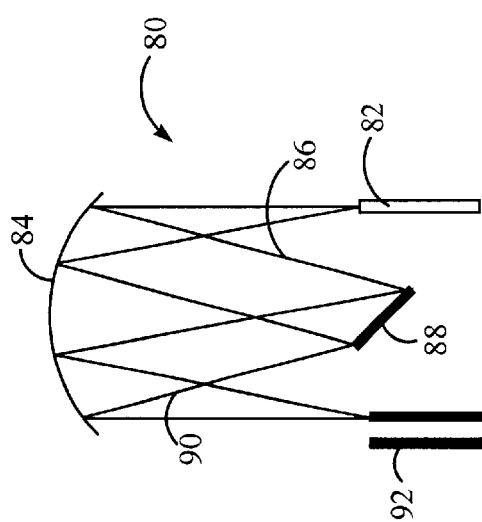
FIG. 9 is a third alternate embodiment of the multiplexer/demultiplexer using a single collimating/focusing mirror.

FIG. 9 is a schematic representation of a third alternate embodiment 80 using a single concave mirror as both a collimating and focusing optic along the optical axis. In this embodiment, input fiber 82 directs a beam consisting of multiplexed channels to the surface of the concave mirror 84. A collimated beam 86 is reflected off the echelle grating 88 which diffracts the multiplexed signal in the manner discussed above. The demultiplxed channels are then reflected off the surface of the concave mirror 84 and directed into the array of output fibers 92. While the embodiment 80 contemplates the mirror 84 being spherical and therefore having a constant diameter of, for example 25 cm, a slightly parabolic or aspheric mirror may be used to improve image quality, if necessary.

Figure 10:
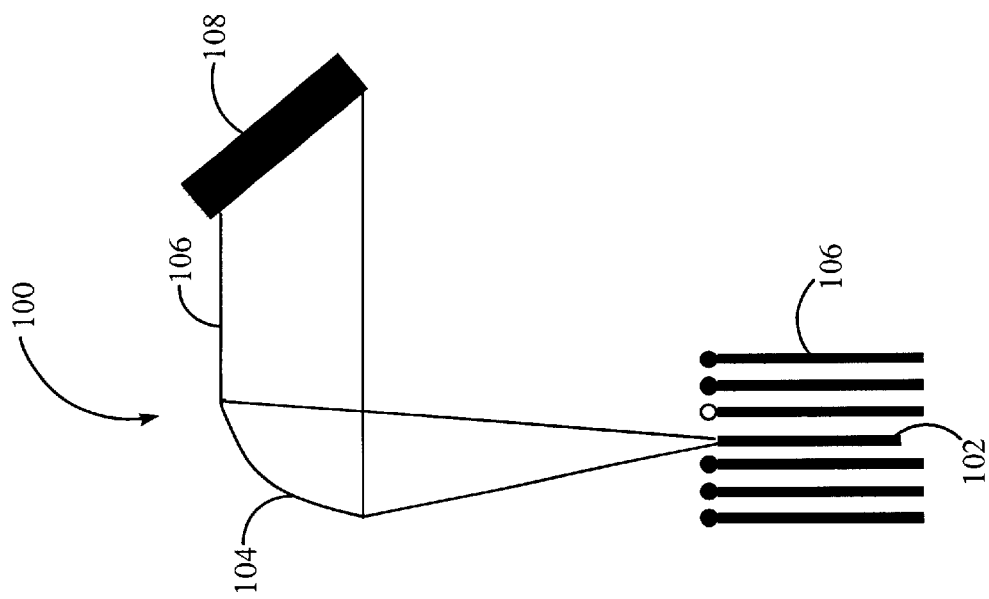
FIG. 10 is a fourth alternate embodiment of the multiplexer/demultiplexer in accordance with the present invention using an off-axis parabolic mirror as the collimating/focusing optic with the device arranged in a near-littrow configuration.

FIG. 10 is a fourth alternate embodiment 100 using an off-axis parabolic mirror as the collimating/focusing optic. In this embodiment, multiplexed light from the input fiber 102 is directed off the front surface of an off-axis parabolic mirror 104 which in turn directs a collimated beam of light 106 off the surface of an echelle grating 108. The multiplexed light is reflected off the surface of the echelle grating 108 back to the surface of the off-axis parabolic mirror 104 and dispersed to respective output fibers 106. In this embodiment, the echelle grating is in near-littrow configuration, thereby directing light back to the output fibers 106.

Figure 11:
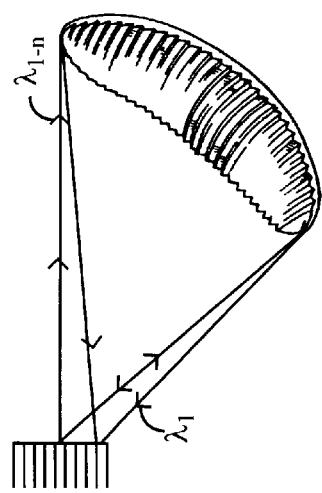
FIG. 11 is a fifth alternate embodiment of the multiplexer/demultiplexer of the present invention using a concave echelle grating.

A fifth alternate embodiment illustrated in FIG. 11 uses a concave echelle grating 107 configured to be the optic which collimates and focuses the incoming beam. This embodiment eliminates the need for the collimating/focusing lenses or concave mirrors of alternate embodiments one-four.

Various modifications can be provided to the basic echelle grating demultiplexer structures illustrated schematically in FIGS. 1–11 to further increase the channel carrying capacity of single mode optical fibers. As alluded to above, it is foreseeable in the future that advancements in optical amplifier technology will enable bandwidth in excess of the current 60–80 nm bandwidth used in optical communication. Such broad bandwidths tax the ability of an echelle grating DWDM to effectively multiplex and demultiplex the entire bandwidth, particularly in the frequencies at the edge of this broad band. Accordingly, it would be useful and desirable to use a network of echelle grating DWDM devices with each device optimized to multiplex/demultiplex light in a portion of the broad spectral range. For example, assuming future amplifier technologies enable bandwidths on the order of 120–180 nm, each echelle grating DWDM could be optimized to function with a portion, for example 12, of the bandwidth, 60–90 nm.

Figure 12:
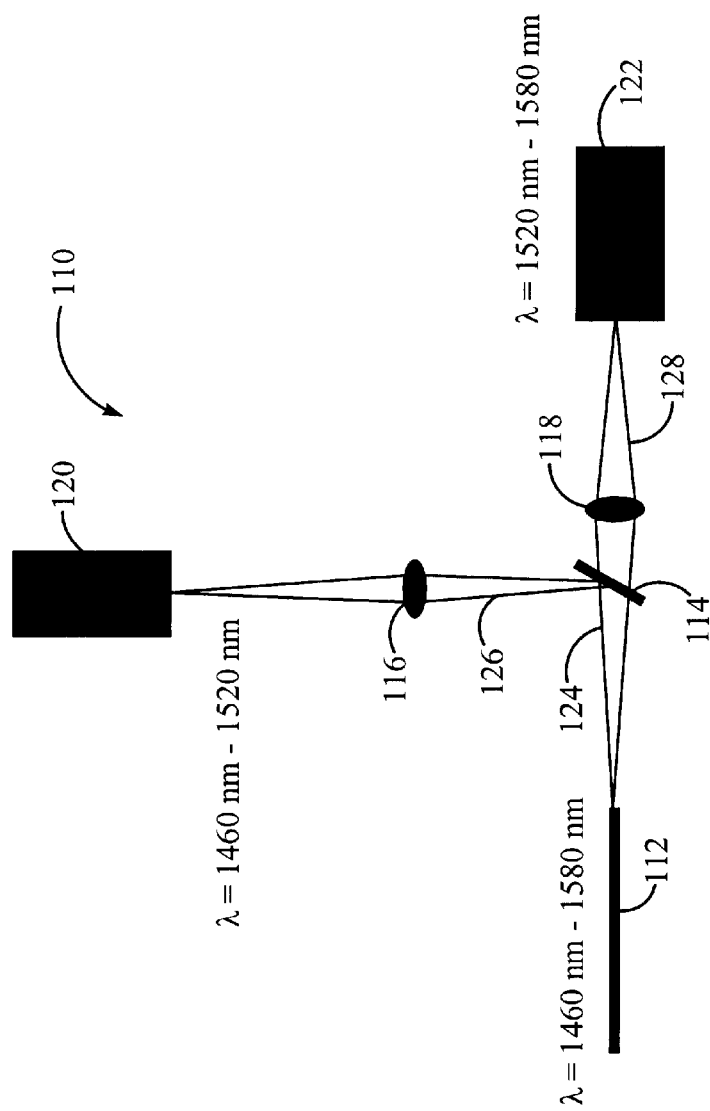
FIG. 12 is a schematic representation of an apparatus for dividing a broad bandwidth into bandwidth segments for multiplexing/demultiplexing.

FIG. 12 illustrates schematically an apparatus 110 for dividing a broad bandwidth for multiplexing/demultiplexing. The apparatus 110 consists of an input fiber 112, a high pass thin film filter 114, a first focusing lens 116, a second focusing lens 118, a first echelle grating DWDM device 120 and a second echelle DWDM device 122.

By way of example, the operation of the apparatus for dividing broad band signals 110 will be discussed in terms of a demultiplexer. As with other embodiments of this invention, the apparatus may likewise function as a multiplexer simply by reversing the direction of light propagation. A multiplexed beam 124 emitted from the input fiber 112 is directed onto the high pass thin film filter 114. The high pass thin film filter has a design cut off wavelength that reflects the lower half of the wavelength range toward the first echelle grating DWDM 120. The upper half of the wavelength range passes through the filter 114 to the second echelle DWDM device 122. In this example, the input wavelength is in the range of 1460–1580 nm. The high pass thin film filter is designed to cut the band at 1520 nm. Thus, a wavelength range of 1460–1520 nm is directed toward the first echelle grating DWDM and a wavelength band of 1520–1580 nm is directed toward a second echelle grating DWDM device. The signal directed toward the first echelle grating DWDM is optically coupled to the first focusing lens 116 which directs the lower wavelength beam as an input to the first echelle grating DWDM. In a like manner, the upper wavelength beam 128 is optically coupled to the second focusing lens 118 which focuses the upper wavelength beam 128 as an input beam to the second echelle DWDM device 122.

The present example contemplates the use of a high pass thin film filter 114. However, other waveband dividing elements could be used instead, including devices using fiber Bragg gratings.

Figure 13:
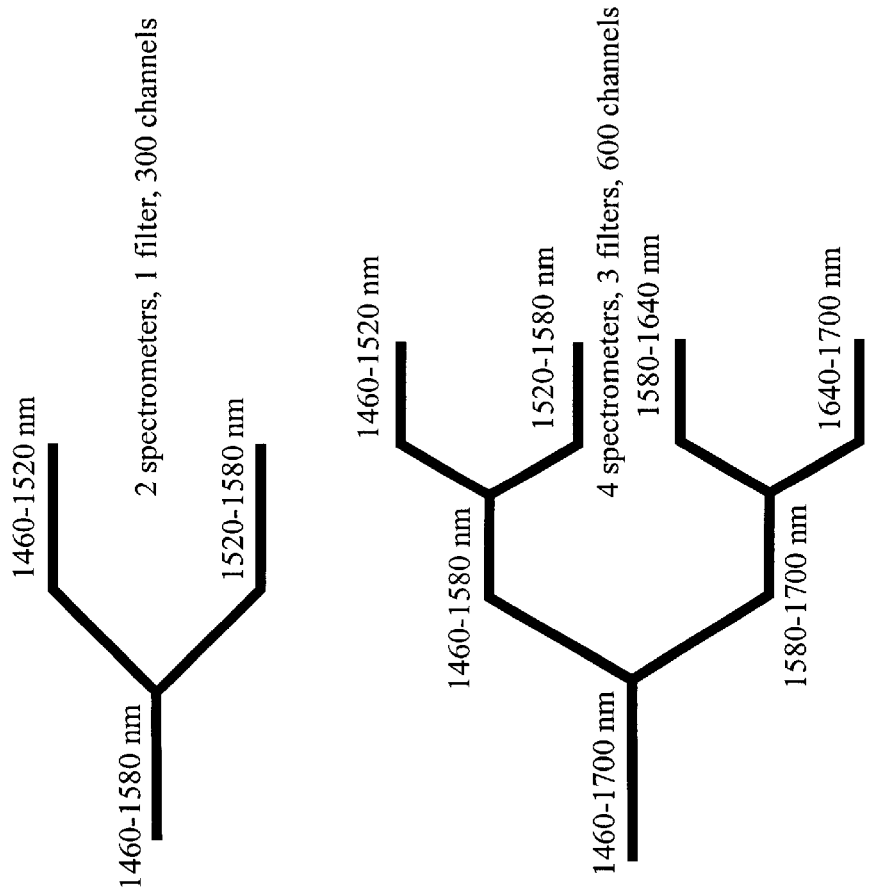
FIG. 13 is a schematic representation of the embodiment of FIG. 12 using three waveband dividing elements.

The first and second echelle grating DWDM devices 120, 122 of the present invention could have any of the configurations discussed above with regard to FIGS. 1–11. The use of the echelle DWDM devices for demultiplexing the split wavelength bands provide the many advantages discussed above with regard to the embodiments illustrated in FIGS. 1–11. However, the present invention could be practiced with other DWDM devices such as fiber Bragg grating devices, integrated waveguide arrays or the like. With an echelle spectrograph permitting wavelength spacing of 0.4 nm, a device for providing a total wavelength range of 120 nm will allow up to 300 channels to be demultiplexed from a single fiber. Furthermore, this system is scalable. FIG. 13 illustrates schematically how an input bandwidth of 1460–1700 nm can be divided using three waveband dividing elements to four 60 nm bandwidth beams each of which can be input into an optimized echelle grating DWDM device. Such a device is capable of accommodating a total waveband of 240 nm and assuming a wavelength spacing of 0.4 nm, a total channel count of 600.

Figure 14:
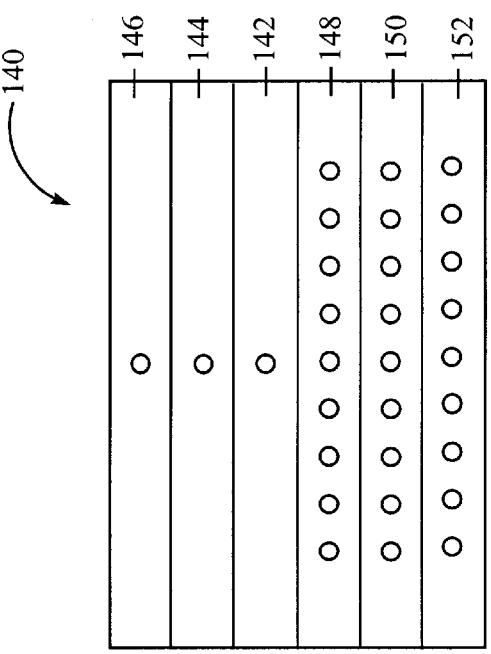
FIG. 14 is a schematic elevation of a pigtail harness having a one-dimensional input array of fibers and a two dimensional output array of fibers.

The bulk optic echelle DWDM of the present invention is able to simultaneously demultiplex signals from a number of input fibers. In each of the echelle grating DWDM devices illustrated in FIGS. 1–7 and 9–11 above, light is spacially resolved in only one dimension, vertically in a direction transverse the dispersion direction. As a result, input fibers can be vertically stacked in a linear array and a corresponding two dimensional array of output fibers can be provided for receiving demultiplexed signals from the various input fibers. This concept is illustrated schematically in FIG. 14. FIG. 14 is an elevation view of a pigtail harness 140 from the direction of the collimating/focusing optic. First, second and third input fibers 142, 144, 146 lying in a vertical linear array are optically coupled to first, second and third horizontal output rows 148, 150, 152, respectively. Thus, a one dimensional input array produces a two-dimensional output array. While the present example is limited to three input fibers 142, 144, 146 and only nine output fibers in the output first, second and third output rows 148, 150, 152, the actual number of output fibers will correspond to the number of input channels and will be a function of the channel separation and input bandwidth, and may easily exceed 90 output fibers per output fiber row. Each output fiber has a core center, and the output fiber core centers are spaced a distance equal to the linear separation of the grating at the device focal length. Further, the number of corresponding input and output arrays may be greater than three and is largely a function of external factors such as the space available for the pigtail harness 140. As should be appreciated, this configuration allows a single demultiplexer to demultiplex channels from a number of input fibers, thereby minimizing the number of echelle grating DWDM devices required for a multiple input fiber optical system. This further illustrates the flexibility and scalability of the echelle grating DWDM devices in accordance with the invention.

Figure 15:
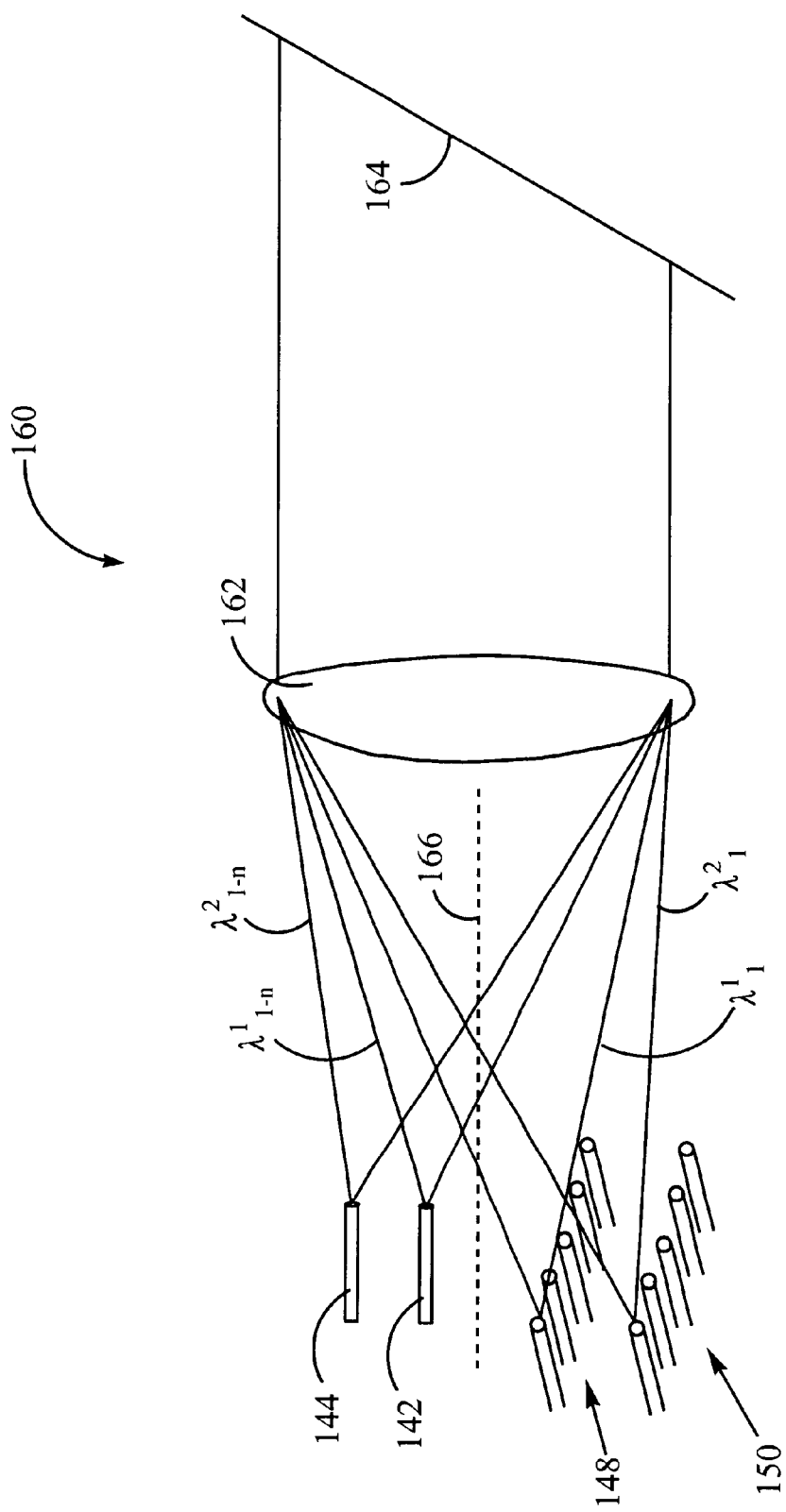
FIG. 15 is a schematic representation of a multiplexer/demultiplexer having stacked multiplex fibers and a two-dimensional array of single channel fibers.

FIG. 15 is a schematic representation of a preferred embodiment of a stacked input bulk optic echelle DWDM device 160. Input beam $\lambda^1_{1-10}$ from input fiber 142 is directed to the collimating/focusing optic 162 and a collimated beam is then directed off the reflective surface of the reflective echelle grating 164. The diffracted channels $\lambda^1_1$, $\lambda^1_2$ then return through the collimating/focusing optic 162 and are dispersed to the fibers comprising the first output row 148 as illustrated by $\lambda^1_1$. The collimating/focusing optic has an optical axis 166 and the input fiber 142 and the output row 148 are equally spaced from the optical axis 166 of the collimating/focusing optic in the vertical direction. In a like manner, a multiplexed input beam $\lambda^2_{1-n}$ is emitted from the input fiber 144 and its various channels $\lambda^2_1$, $\lambda^2_2$ are diffracted to the second horizontal output row 150. With respect to each of output rows 148 and 150, the centers of the optical fibers in the row are each spaced a distance from the centers of adjacent optical fibers in the row equal to the channel separation of the echelle grating 164 at the focal length of the focusing/collimating optic 162. The propagating ends of the output fibers as well as the propagating ends of the input fibers all lie in a plane spaced the focal length of the collimating/focusing optic from the collimating/focusing optic.

Figure 16:
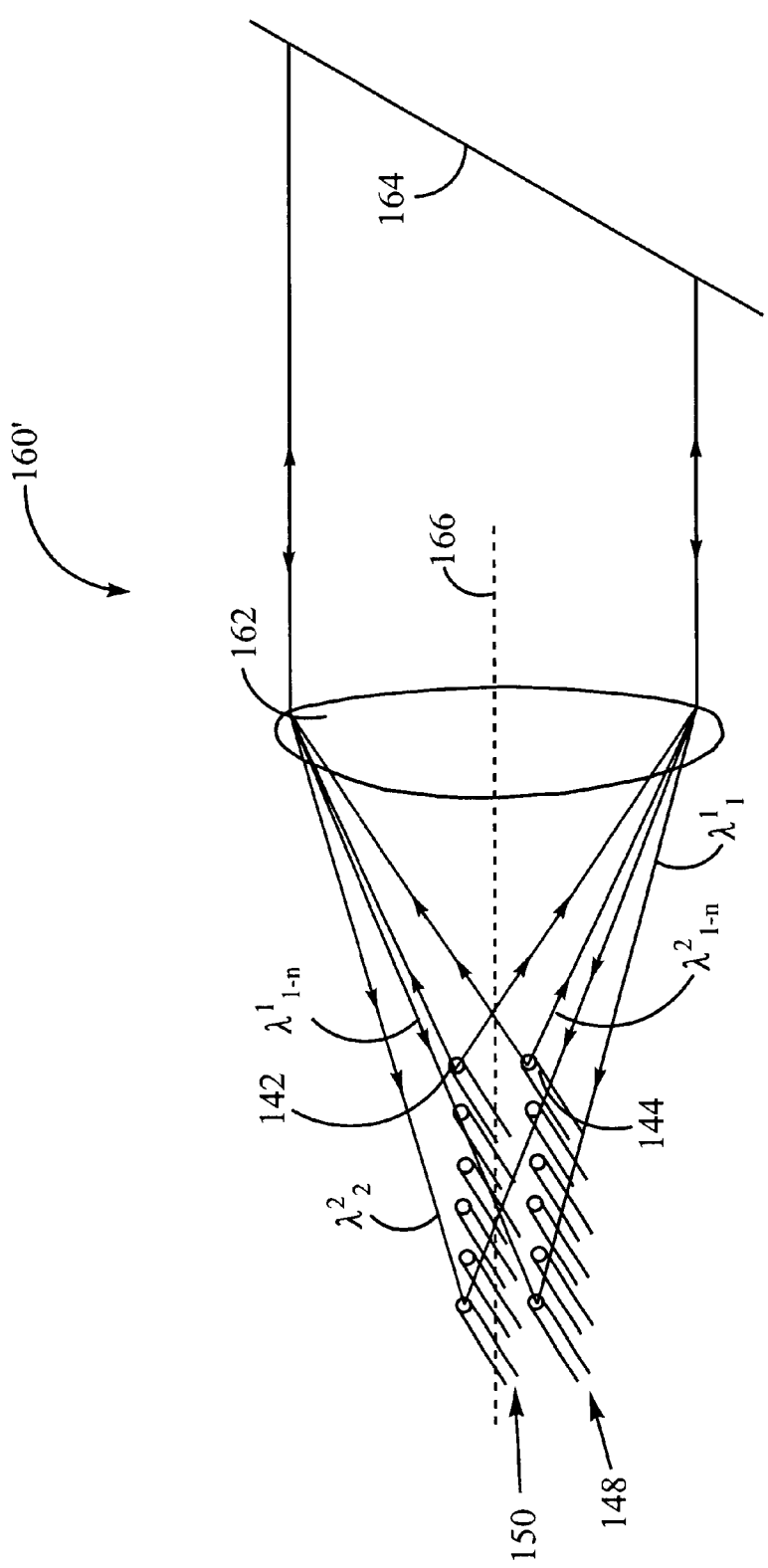
FIG. 16 is a alternate embodiment of a multiplexer/demultiplexer having a stacked input fiber array and a two-dimensional array of output fibers.

FIG. 16 is a schematic representation of another embodiment of a stacked input optic echelle DWDM device 160'. This device is generally the same as that depicted in FIG. 15 and uses the same reference numbers for ease of reference. The significant difference between this embodiment and that of FIG. 15 is the input fibers 142, 144 are deployed with the input fiber 142 co-linear with the second horizontal output row 150 and the input fiber 144 co-linear with the first output row 148. In this embodiment, the multiplexed beam $\lambda^1_{1-n}$ emitted from the input fiber 142 is diffracted into the first output row 148 and the multiplexed input beam $\lambda^2_{1-n}$ emitted from the input fiber 144 is diffracted into the second horizontal output row 150. This is represented by the single beams $\lambda^1_1$ and $\lambda^2_1$, with beams $\lambda^1_{2-n}$ and $\lambda^2_{2-n}$ being omitted for clarity. The input fibers 142, 144 and the horizontal output rows 148, 150 are equally spaced from the optical axis 166.

Figure 17:
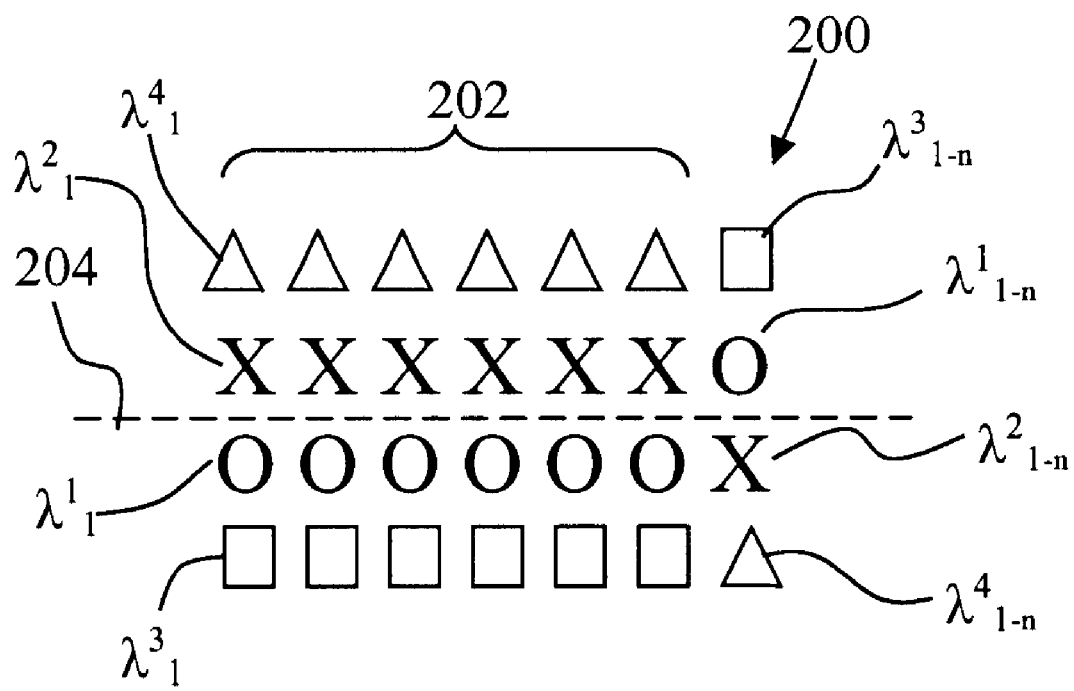
FIG. 17 is a schematic representation of the embodiment of FIG. 16 having 4 multi-channel input fibers and 4×n single channel output fibers.

FIG. 17 illustrates schematically a four input fiber linear array 200 for multiplex input beams $\lambda^1_{1-n}$, $\lambda^2_{1-n}$, $\lambda^3_{1-n}$ and $\lambda^4_{1-n}$ and a corresponding 4 by n two dimensional array of single channel fibers 202 for receiving single channel beams, e.g., $\lambda^1_1$, $\lambda^2_2$, $\lambda^3_3$, $\lambda^4_4$. The input or multiplex fiber array 200 is perpendicular to the rows of single channel fibers of the array 202. This further illustrates how the input fibers are spaced the same distance from the optical axis 204 as the corresponding row of single channel output fibers. Additional input and output fibers can be added by stacking them in the same manner as illustrated in FIG. 17.

The echelle grating DWDM devices in accordance with the present invention provide for dense channel spacing (0.4 nm) over a given bandwidth, thereby maximizing the number of channels that can be carried by a single fiber for a given bandwidth. By careful selection of the echelle grating blaze angle and step spacing, the channels may be multiplexed/demultiplexed at high resolutions and high efficiencies. Further, use of the echelle grating enables a smaller form factor because the angular diffraction allows for shorter focal lengths between the focusing lens and the input/output fibers. The use of bulk optical elements provides a system which is easy to manufacture, highly reliable and scalable. Further embodiments of the invention including the use of a waveband dividing element such as a thin film high pass filter allows extremely broad bands of signals to be divided and simultaneously multiplexed or demultiplexed in parallel. Because the device disperses light in a single linear dimension, a plurality of input fibers can be stacked so that each bulk optic echelle grating DWDM device can accommodate multiple input fibers.

What is claimed is:

1. A dense wavelength multiplexer/demultiplexer for use in optical communications systems using optical signals in a select near infrared wavelength range and a select channel spacing, the multiplexer/demultiplexer comprising:

at least two multiplex optical waveguides each propagating a distinct multiplexed optical signal comprising a plurality of channels, the multiplex optical waveguides being arranged in a linear array;

a two dimensional array of single channel waveguides, the two dimensional array being arranged in linear rows perpendicular to the multiplex linear array with each linear row corresponding to a multiplex optical waveguide; and a reflective echelle grating optically coupled to the multiplex optical waveguides and the single channel optical waveguides, the echelle grating having a groove spacing of between about 50–300 grooves per millimeter and a blaze angle of between about 51–53 degrees.

2. The dense wavelength multiplexer/demultiplexer of claim 1 further comprising a collimating/focusing optic having a select focal length optically coupled between the multiplex and single channel waveguide arrays.

3. The dense wavelength multiplexer/demultiplexer of claim 2 wherein the echelle grating is formed in a concave substrate having a focal length of 152.4 millimeters or less and the echelle grating comprises the collimating/focusing optic.

4. The dense wavelength multiplexer/demultiplexer of claim 2 wherein the select focal length is less than 152.4 millimeters.

5. The dense wavelength multiplexer/demultiplexer of claim 1 wherein the select near infrared wavelength range is between about 1520–1610 nanometers and the select channel spacing is 0.8 nanometers or less.

6. An apparatus for use in optical communications systems to multiplex or demultiplex an optical signal comprising optical channel(s) of distinct wavelength(s) having a select channel spacing within a select wavelength range, the apparatus comprising:

a plurality of optical waveguides aligned generally along the same optical axis each having a propagating end, at least two of the optical waveguides each propagating a distinct multiplex optical signal comprising a plurality of channels, the multiplex optical waveguides being arranged in a multiplex linear array and the others of the optical waveguides being single channel waveguides arranged in a two dimensional array with linear rows perpendicular to the multiplex linear array with each linear row corresponding to a multiplex optical waveguide; and a reflective echelle grating optically coupled to the plurality of optical waveguides along the optical axis receiving an optical signal emitted from at least one of the single channel or multiplex optical waveguides and diffracting the optical signal(s) into at least one other of the multiplex or single channel optical waveguides, respectively.

7. The apparatus of claim 6 wherein the reflective echelle grating has a groove spacing of between about 50 and 300 grooves per millimeter and blaze angle of between about 51–53 degrees.

8. The apparatus of claim 7 wherein the blaze angle provides a channel separation of at least 40 microns for a focal length of 152.4 mm or less for an order of diffraction between 4–7.

9. The apparatus of claim 6 wherein the optical waveguides propagating the single channels have a core center, the core centers of adjacent single channel waveguides being spaced 125 microns or less.

10. The apparatus of claim 6 wherein select wavelength range is between 1520 and 1610 nanometers, the select channel spacing is 0.8 nanometers or less.

11. The apparatus of claim 6 further comprising a collimating/focusing optic having a select focal length optically coupled between the plurality of optical waveguides and the reflective echelle grating, the collimating/focusing optic being optically coupled to the plurality of optical waveguides at the select focal length.

12. The apparatus of claim 6 wherein the echelle has a groove spacing of about 171.4 grooves per millimeter and a blaze angle of about 52.6 degrees.

13. The apparatus of claim 6 wherein a number of single channel waveguides in each row is at least equal to the plurality of channels in the multiplexed optical signals.

14. The apparatus of claim 6 wherein the reflective echelle grating is formed in a concave substrate which focuses the optical signal received from the at least one optical waveguide into the at least one other of the optical waveguides.

15. A method of multiplexing or demultiplexing an optical signal in an optical communications system, the optical signal comprising optical channel(s) of a 0.8 nanometer or less channel spacing and different wavelength within a wavelength range between 1520 and 1610 nanometers, the method comprising:

a) providing a plurality of optical waveguides aligned generally along the same optical axis, at least two of the waveguides propagating a plurality of multiplexed channels, the at least two multiplex waveguides being aligned in a multiplex linear array and the others of the optical waveguides propagating single channels;

b) aligning the others of the optical waveguides in a two dimensional array having linear rows perpendicular to the multiplex linear array with each multiplex waveguide corresponding to a distinct linear row of single channel waveguides;

c) directing an optical signal from at least one of the optical waveguides to a reflective echelle grating optically coupled to the plurality of optical waveguides along the optical axis;

d) diffracting the optical signal(s) generally along the optical axis; and e) optically coupling the optical signal(s) into the at least one other of the optical waveguides at a select focal length.

16. The method of claim 15 wherein step c) the reflective echelle grating has a blaze angle of between about 51–53 degrees and a groove spacing of between about 50–300 grooves/millimeter.

17. A bulk optic echelle grating for use in multiplexing and demultiplexing optical signals in optical communications systems operating in a near infrared wavelength range, the grating comprising a groove spacing of between about 50–300 grooves/millimeter and a blaze angle of between about 51–53 degrees.

* * * * *